(12) United States Patent
Torikura et al.

(10) Patent No.: US 11,282,235 B2
(45) Date of Patent: Mar. 22, 2022

(54) VEHICLE SURROUNDINGS RECOGNITION APPARATUS

(71) Applicant: DENSO CORPORATION, Kariya (JP)

(72) Inventors: Takamichi Torikura, Kariya (JP); Kenji Okano, Kariya (JP); Matias Focken, Kariya (JP)

(73) Assignee: DENSO CORPORATION, Kariya (JP)

( * ) Notice: Subject to any disclaimer, the term of this patent is extended or adjusted under 35 U.S.C. 154(b) by 132 days.

(21) Appl. No.: 16/739,472

(22) Filed: Jan. 10, 2020

(65) Prior Publication Data

US 2020/0151912 A1 May 14, 2020

Related U.S. Application Data (63) Continuation of application No. PCT/JP2018/026190, filed on Jul. 11, 2018.

(30) Foreign Application Priority Data

Jul. 14, 2017 (JP) .............................. JP2017-137853

(51) Int. Cl.
*G06K 9/00* (2006.01)
*G06K 9/46* (2006.01)
(Continued)

(52) U.S. Cl.
CPC .................. *G06T 7/90* (2017.01); *G06T 7/97* (2017.01); *G06K 9/00791* (2013.01);
(Continued)

(58) Field of Classification Search
CPC ........... G06K 9/00791; G06K 9/00798; G06K 9/4652; G06T 7/73; G06T 7/90;
(Continued)

(56) References Cited

U.S. PATENT DOCUMENTS 5,835,614 A * 11/1998 Aoyama ............ G06K 9/00798
382/104
6,445,809 B1 * 9/2002 Sasaki ........................ B60R 1/00
340/436
(Continued)

FOREIGN PATENT DOCUMENTS

JP  2009-031939 A  2/2009
JP  4270183 B2  3/2009
(Continued)

OTHER PUBLICATIONS

Polidorio et al. ("Automatic shadow segmentation in aerial color images," 16th Brazilian Symposium on Computer Graphics and Image Processing; Date of Conference: Oct. 12-15, 2003) (Year: 2003).*

(Continued)

*Primary Examiner* — Yubin Hung
(74) *Attorney, Agent, or Firm* — Maschoff Brennan (57) ABSTRACT

In a vehicle surroundings recognition apparatus that recognizes a specific target around a vehicle from an image captured by an imaging unit, a shadow detection unit is configured to detect a shadow region based on a difference, between a plurality of elements constituting the image, in intensity of a specific color component included in colors represented by the plurality of elements and a difference in luminance between the plurality of elements, the shadow region being a region in the image in which a shadow is cast on a surface of the road. A feature point detection unit is configured to detect feature points in the image. A recognition unit is configured to recognize the target based on the shadow region detected by the shadow detection unit and a group of feature points detected by the feature point detection unit.

7 Claims, 9 Drawing Sheets

(51) Int. Cl.
*G06T 7/00* (2017.01)
*G06T 7/73* (2017.01)
*G06T 7/90* (2017.01)
*H04N 5/232* (2006.01)
*H04N 5/247* (2006.01)

(52) U.S. Cl.
CPC ....... *G06K 9/00798* (2013.01); *G06K 9/4652* (2013.01); *G06T 7/73* (2017.01); *G06T 2207/10024* (2013.01); *G06T 2207/30252* (2013.01); *G06T 2207/30256* (2013.01); *H04N 5/247* (2013.01)

(58) Field of Classification Search
CPC ............. G06T 7/97; G06T 2207/10024; G06T 2207/30252; G06T 2207/30256; G06T 7/00791; G06T 7/00798; G06T 7/4652; H04N 5/23238; H04N 5/247
See application file for complete search history.

(56) References Cited

U.S. PATENT DOCUMENTS

| 9,430,715 B1* | 8/2016 | Wang | G06T 7/11 |
| 2005/0114027 A1* | 5/2005 | Boright | G06K 9/0063 702/3 |
| 2010/0232705 A1* | 9/2010 | Li | G06K 9/00771 382/195 |
| 2011/0032389 A1* | 2/2011 | Miyawaki | G06T 7/12 348/234 |
| 2015/0070394 A1* | 3/2015 | Yanagawa | G06T 5/50 345/649 |

FOREIGN PATENT DOCUMENTS

| JP | 2010-237976 A | | 10/2010 |
| JP | 2011-065442 A | | 3/2011 |
| JP | 2011065442 A | * | 3/2011 |
| JP | 2014-35561 A | | 2/2014 |

OTHER PUBLICATIONS

Tsai, V.J.D. ("A comparative study on shadow compensation of color aerial images in invariant color models," IEEE Transactions on Geoscience and Remote Sensing; vol. 44, Issue: 6, Jun. 2006) (Year: 2006).*

Funka-Lea et al. ("Combining color and geometry for the active, visual recognition of shadows," Proceedings of IEEE International Conference on Computer Vision; Date of Conference: Jun. 20-23, 1995) (Year: 1995).*

Sun et al. ("Moving Cast Shadow Detection of Vehicle Using Combined Color Models," Chinese Conference on Pattern Recognition; Date of Conference: Oct. 21-23, 2010) (Year: 2010).*

* cited by examiner

SHADOW OF VEHICLE        ✖ : POSITION OF
                               COMPARISON TARGET

FIG.9

SHADOW OF VEHICLE        ✖ : POSITION OF
                               COMPARISON TARGET

FIG.10

SHADOW OF VEHICLE        SHADOW OF PERSON

VEHICLE SURROUNDINGS RECOGNITION APPARATUS

CROSS REFERENCE TO RELATED APPLICATIONS

This international application claims the benefit of priority from Japanese Patent Application No. 2017-137853 filed with the Japan Patent Office on Jul. 14, 2017, the entire contents of which are incorporated herein by reference.

BACKGROUND

Technical Field

The present disclosure relates to a vehicle surroundings recognition apparatus that recognizes a target from a captured image of a road around a vehicle.

RELATED ART

A known white line detection apparatus detects a white line drawn on the road based on a captured image of a road. The white line detection apparatus is configured to set a shadow region based on a change in brightness of the image and eliminate an edge of the shadow region and then detect a white line. According to the prior art, when a shadow of the own vehicle, a building, or the like is present on a surface of the road, a reduction in accuracy of the white line detection may occur.

DESCRIPTION OF SPECIFIC EMBODIMENTS

The white line detection apparatus disclosed in Japanese Patent No 4270183 estimates the shadow region in the detected edge only based on the change in brightness of the image. Accordingly, the white line detection apparatus may misidentify, as a shadow, a change in brightness which is not actually the shadow.

In view of the foregoing, it is desired to have a vehicle surroundings recognition apparatus capable of improving accuracy of target detection by accurately detecting a shadow that is cast on a surface of a road.

One aspect of the present disclosure provides a vehicle surroundings recognition apparatus according to an aspect of the present disclosure acquires an image captured by an imaging unit. The imaging unit is mounted to a vehicle to capture an image of an area including a road around the vehicle. The vehicle surroundings recognition apparatus recognizes a specific target that is present in the surroundings of the vehicle from the acquired image. The vehicle surroundings recognition apparatus includes a shadow detection unit, a feature point detection unit, and a recognition unit.

The shadow detection unit is configured to detect a shadow region based on a difference, between a plurality of elements constituting the image, in intensity of a specific color component included in a color represented by the plurality of elements and a difference in luminance between the plurality of elements. The shadow region is a region in the image in which a shadow is cast on a surface of the road. The feature point detection unit is configured to detect a feature point in the image. The recognition unit is configured to recognize the target based on the detected shadow region and a group of detected feature points.

As a result of a study, the inventors have found a characteristic that when a color of an image is compared between a region illuminated by sunlight and a shadow region, a blue component is observed with higher intensity in the shadow region than in the region illuminated by sunlight. This characteristic results from the influence of Rayleigh scattering. That is, in the region illuminated by sunlight and the shadow region in the image, in addition to a change in brightness, a change in specific color component is observed. Thus, the vehicle surroundings recognition apparatus according to the present disclosure determines a shadow region based on not only luminance of an image but also intensity of a specific color component of the image. By performing such a determination, the vehicle surroundings recognition apparatus can improve robustness against a change in brightness of the image and accurately detect a shadow region. Then, by performing target detection considering the detected shadow region, the vehicle surroundings recognition apparatus can accurately detect an intended target.

An embodiment of the present disclosure will be described below with reference to the drawings. The present disclosure is not limited to the following embodiment and can be implemented in various aspects.

Overall Configuration of Vehicle Surroundings Recognition Apparatus

Figure 1:
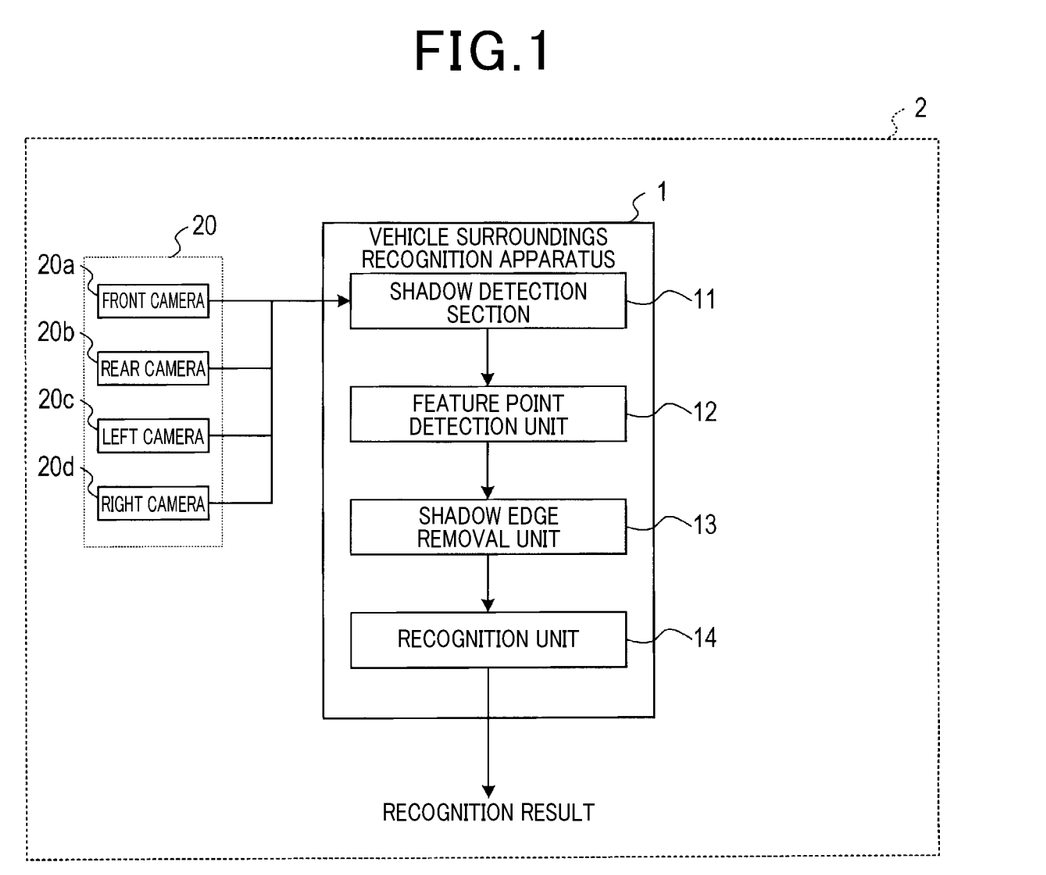
FIG. 1 is a block diagram showing a configuration of a vehicle surroundings recognition apparatus of an embodiment.

A vehicle surroundings recognition apparatus 1 of the embodiment is an electronic control apparatus mounted to a vehicle 2. As illustrated in FIG. 1, the vehicle surroundings recognition apparatus 1 is connected to an imaging unit 20 mounted to the vehicle 2. The imaging unit 20 includes four cameras 20a, 20b, 20c, and 20d. The cameras 20a to 20d are an imaging apparatus that captures a digital color image (hereinafter referred to as an image) represented by a YUV color model.

Figure 2:
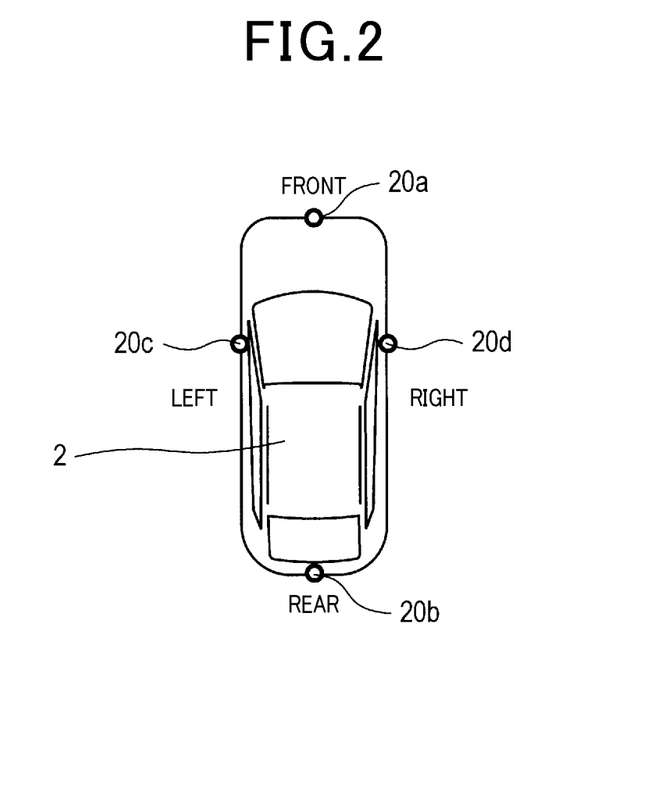
FIG. 2 is an explanatory diagram showing an example of a mounting position of cameras in a vehicle.

As illustrated in FIG. 2, the four cameras 20a to 20d are mounted as a front camera, a rear camera, a left camera, and a right camera at a front, rear, left, and right of the vehicle 2, respectively, so that the cameras 20a to 20d can thoroughly capture images of the surroundings of the vehicle. The cameras 20a to 20d are for capturing images of areas including at least a road surface of a road on a front side, a rear side, a left side, and a right side of the vehicle 2, respectively. An attachment position and orientation of the cameras 20a to 20d to the vehicle 2 are set in advance so that the cameras 20a to 20d have the areas described above. Based on the set attachment position and orientation (i.e., an imaging direction), an actual mounting position of the cameras 20a to 20d is adjusted in a manufacturing facility, a maintenance facility, or the like.

Returning to the description of the block diagram in FIG. 1, the vehicle surroundings recognition apparatus 1 is an information processing apparatus mainly composed of a central processing unit (CPU), a read-only memory (ROM), a random-access memory (RAM), a semiconductor memory, an input-output interface, and the like (not shown). The vehicle surroundings recognition apparatus 1 is implemented, for example, by a microcontroller having integrated functions of a computer system, and the like. The functions of the vehicle surroundings recognition apparatus 1 are implemented by the CPU by executing a program stored in a tangible storage medium such as the ROM or the semiconductor memory. The vehicle surroundings recognition apparatus 1 may be composed of a single microcontroller or a plurality of microcontrollers.

The vehicle surroundings recognition apparatus 1 has a function of recognizing a specific target that is present in the surroundings of the vehicle 2 from an image captured by the cameras 20a to 20d. The present embodiment describes an example in which a white line of a lane marker drawn on a road surface of a road on which the vehicle 2 is travelling is mainly recognized as the specific target. Alternatively, the vehicle surroundings recognition apparatus 1 may be configured to recognize, as the specific target, for example, a traffic moving object such as a vehicle or a pedestrian or a marking on the road surface, besides the lane marker.

The vehicle surroundings recognition apparatus 1 includes, as functional components, a shadow detection unit 11, a feature point detection unit 12, a shadow edge removal unit 13, and a recognition unit 14. A method of implementing these components constituting the vehicle surroundings recognition apparatus 1 is not limited to software, and some or all of the components may be implemented by hardware in which a logic circuit, an analog circuit, and the like are combined.

The vehicle surroundings recognition apparatus 1 has a function of generating a bird's-eye view image from a viewpoint above the vehicle 2. Specifically, the vehicle surroundings recognition apparatus 1 generates a bird's-eye view image by using the attachment position and orientation of the cameras 20a to 20d as a camera parameter to convert a viewpoint of an image captured by the cameras 20a to 20d. The camera parameter is obtained, for example, by converting, into numerical values, the attachment position of the cameras 20a to 20d to the vehicle 2 and an attachment angle of the cameras 20a to 20d to the vehicle 2 in three axial directions, i.e., front and rear, left and right, and above and below, of the vehicle 2. The vehicle surroundings recognition apparatus 1 uses conversion data set based on the camera parameter to convert a viewpoint of an image captured by the cameras 20a to 20d.

Image Recognition Process

A procedure of an image recognition process performed by the vehicle surroundings recognition apparatus 1 will be described with reference to a flow chart in FIG. 3. This process is repeatedly performed for each predetermined control cycle.

At step S100, the vehicle surroundings recognition apparatus 1 acquires a plurality of images captured by the cameras 20a to 20d during the same period, and compares color tones between the acquired images. Specifically, the vehicle surroundings recognition apparatus 1 compares, between the plurality of images captured by the cameras 20a to 20d, gradient and intensity of a color of pixels distributed in the entire image, and determines whether the images captured by the cameras 20a to 20d have a difference in color tone.

At step S102, the vehicle surroundings recognition apparatus 1 causes the process to branch depending on the result at step S100, i.e., whether the images captured by the cameras 20a to 20d have a difference in color tone. When it is determined that the images captured by the cameras 20a to 20d have no difference in color tone (NO at step S102), the vehicle surroundings recognition apparatus 1 causes control to proceed to step S104.

At step S104, the vehicle surroundings recognition apparatus 1 detects a shadow region by comparing, between images captured by the plurality of different cameras, information on pixels constituting the image. The shadow region is a region in which a shadow is cast on the road surface of the road. Specifically, as a comparison target from each of the plurality of different images, the vehicle surroundings recognition apparatus 1 extracts a pixel in a predetermined image area corresponding to an area including the road surface in the vicinity of the vehicle 2. Then, the vehicle surroundings recognition apparatus 1 calculates a difference, between the pixels as the comparison targets extracted from the respective images, in luminance and intensity of a specific color component included in a color represented by the pixels.

In the present embodiment, a blue component in the YUV color model is used as the specific color component for the comparison. The blue component is used because, due to an influence of Rayleigh scattering, the blue component tends to be observed with higher intensity in a shadow region than in a region illuminated by sunlight. As a result of the calculation of the difference in luminance and blue component, the vehicle surroundings recognition apparatus 1 detects, as a pixel corresponding to a shadow on the road surface, a pixel satisfying a condition that the luminance is lower by a predetermined threshold or more and the intensity of a blue component is higher by a predetermined threshold or more than a pixel with which the comparison is made.

Figure 5:
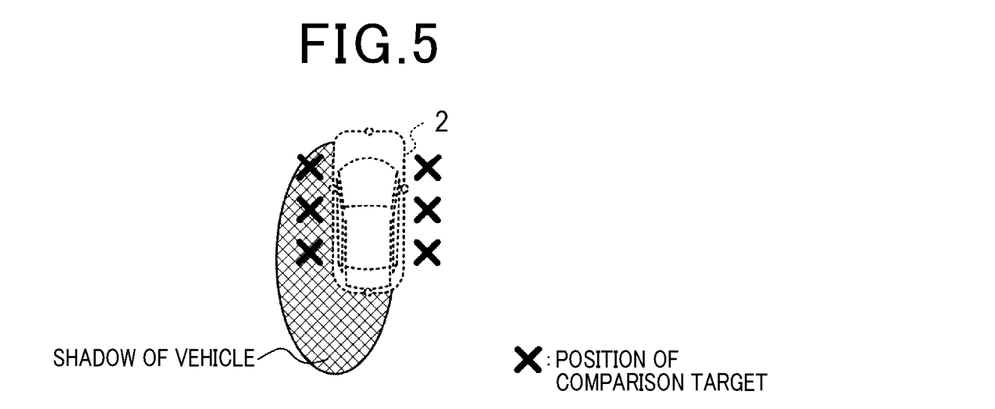
FIG. 5 is an explanatory diagram showing an example of a method of detecting a shadow region.

FIGS. 5 to 9 show specific examples of the pixel serving as the comparison target for detecting a shadow. The examples in FIGS. 5 to 9 assume a situation where a shadow of the vehicle 2 itself extends from a position of the vehicle 2 toward the left rear side of the vehicle 2 on a road surface. FIG. 5 shows an example in which the vehicle surroundings recognition apparatus 1 detects a shadow by using a plurality of captured images of regions on the left side and the right side of the vehicle 2 and using pixels as the comparison targets extracted from neighboring regions on the left side and the right side of the vehicle 2. In the example in FIG. 5, the vehicle surroundings recognition apparatus 1 detects a shadow by using the plurality of captured images of the regions on the left side and the right side of the vehicle 2.

Figure 6:
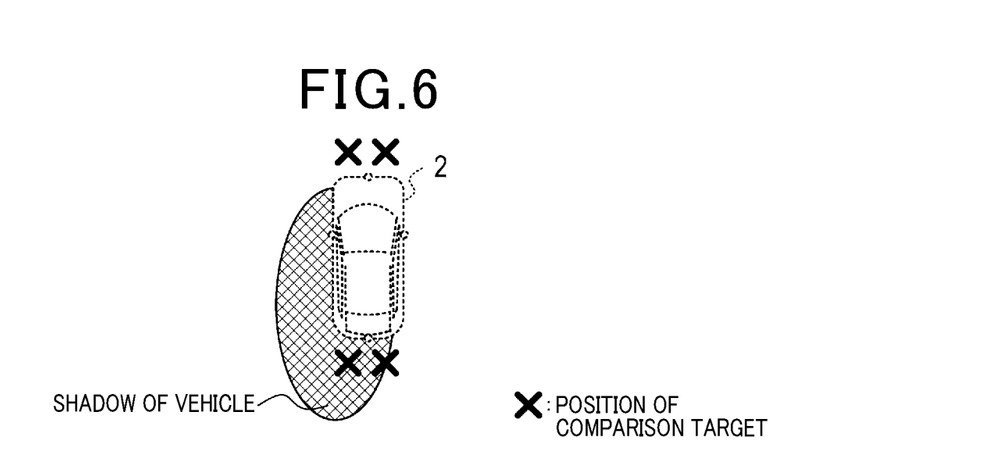
FIG. 6 is an explanatory diagram showing an example of the method of detecting a shadow region.
Figure 7:
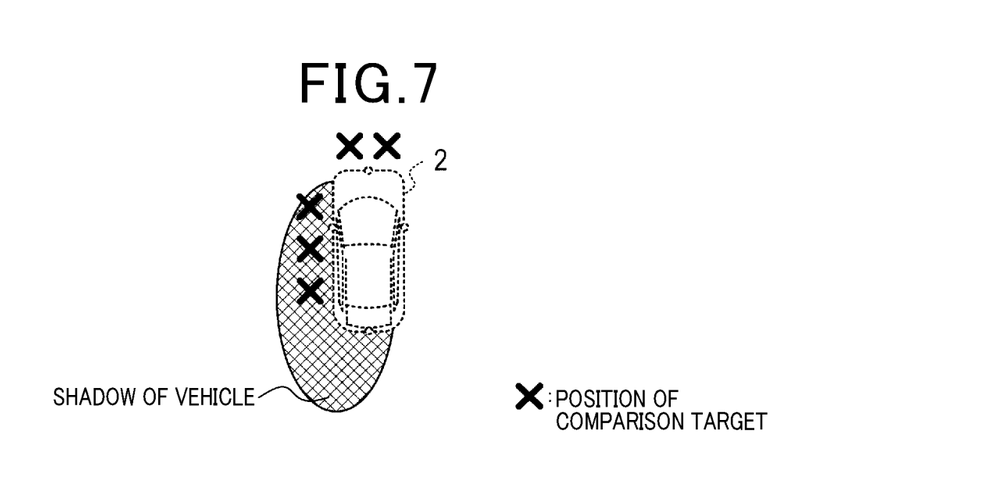
FIG. 7 is an explanatory diagram showing an example of the method of detecting a shadow region.

FIG. 6 shows an example in which the vehicle surroundings recognition apparatus 1 detects a shadow by using pixels as the comparison targets extracted from neighboring regions on the front side and the rear side of the vehicle 2. In the example in FIG. 6, the vehicle surroundings recognition apparatus 1 detects a shadow by using a plurality of captured images of the regions on the front side and the rear side of the vehicle 2. FIG. 7 shows an example in which the vehicle surroundings recognition apparatus 1 detects a shadow by using pixels as the comparison targets extracted from neighboring regions on the front side and the left side of the vehicle 2. In the example in FIG. 7, the vehicle surroundings recognition apparatus 1 detects a shadow by using a plurality of captured images of the regions on the front side and the left side of the vehicle 2.

Figure 8:
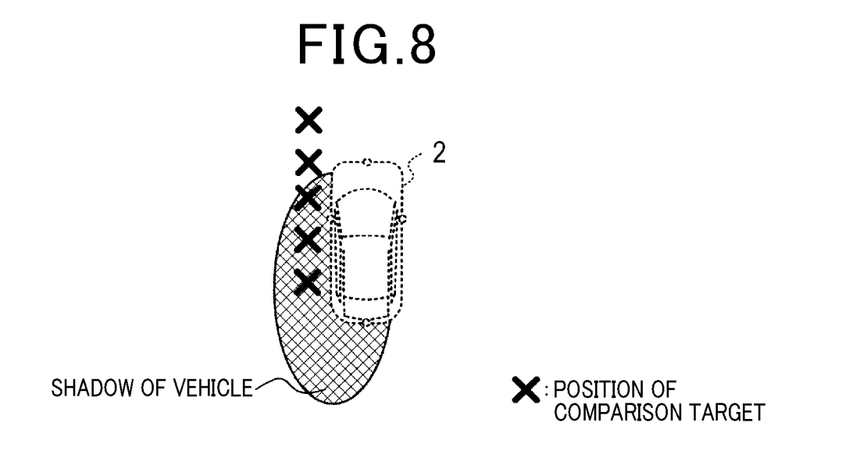
FIG. 8 is an explanatory diagram showing an example of the method of detecting a shadow region.

FIG. 8 shows an example in which the vehicle surroundings recognition apparatus 1 detects a shadow by using pixels as the comparison targets extracted from neighboring regions on the left front side and the left side of the vehicle 2. In the example in FIG. 8, the vehicle surroundings recognition apparatus 1 detects a shadow by using a plurality of captured images of the regions on the left front side and the left side of the vehicle 2. Alternatively, in the example in FIG. 8, the vehicle surroundings recognition apparatus 1 may be configured to detect a shadow by using pixels as the comparison targets extracted from a single captured image of the regions on the left front side and the left side of the vehicle 2.

Figure 9:
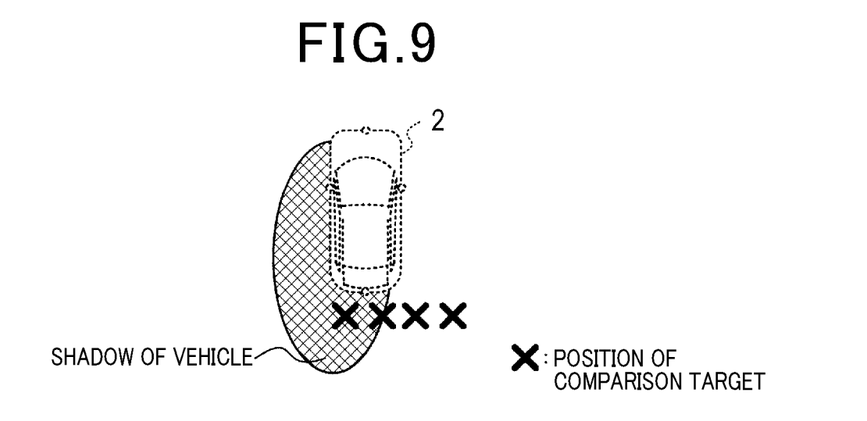
FIG. 9 is an explanatory diagram showing an example of the method of detecting a shadow region.

FIG. 9 shows an example in which the vehicle surroundings recognition apparatus 1 detects a shadow by using pixels as the comparison targets extracted from neighboring regions on the rear side and the right rear side of the vehicle 2. In the example in FIG. 9, the vehicle surroundings recognition apparatus 1 detects a shadow by using a plurality of captured images of the regions on the rear side and the right rear side of the vehicle 2. Alternatively, in the example in FIG. 9, the vehicle surroundings recognition apparatus 1 may be configured to detect a shadow by using pixels as the comparison targets extracted from a single captured image of the regions on the rear side and the right rear side of the vehicle 2.

Since it is known in advance that the shadow of the vehicle 2 itself is cast on the region in the vicinity of the vehicle 2, as illustrated in FIGS. 5 to 9, by extracting the pixels as the comparison targets from the different image regions in the vicinity of the vehicle 2, the vehicle surroundings recognition apparatus 1 can promptly detect a shadow. When a direction in which a shadow extends is known, the vehicle surroundings recognition apparatus 1 can more promptly detect the shadow by comparing pixels between an image in the direction in which the shadow extends and an image in a direction other than the direction in which the shadow extends.

Figure 3:
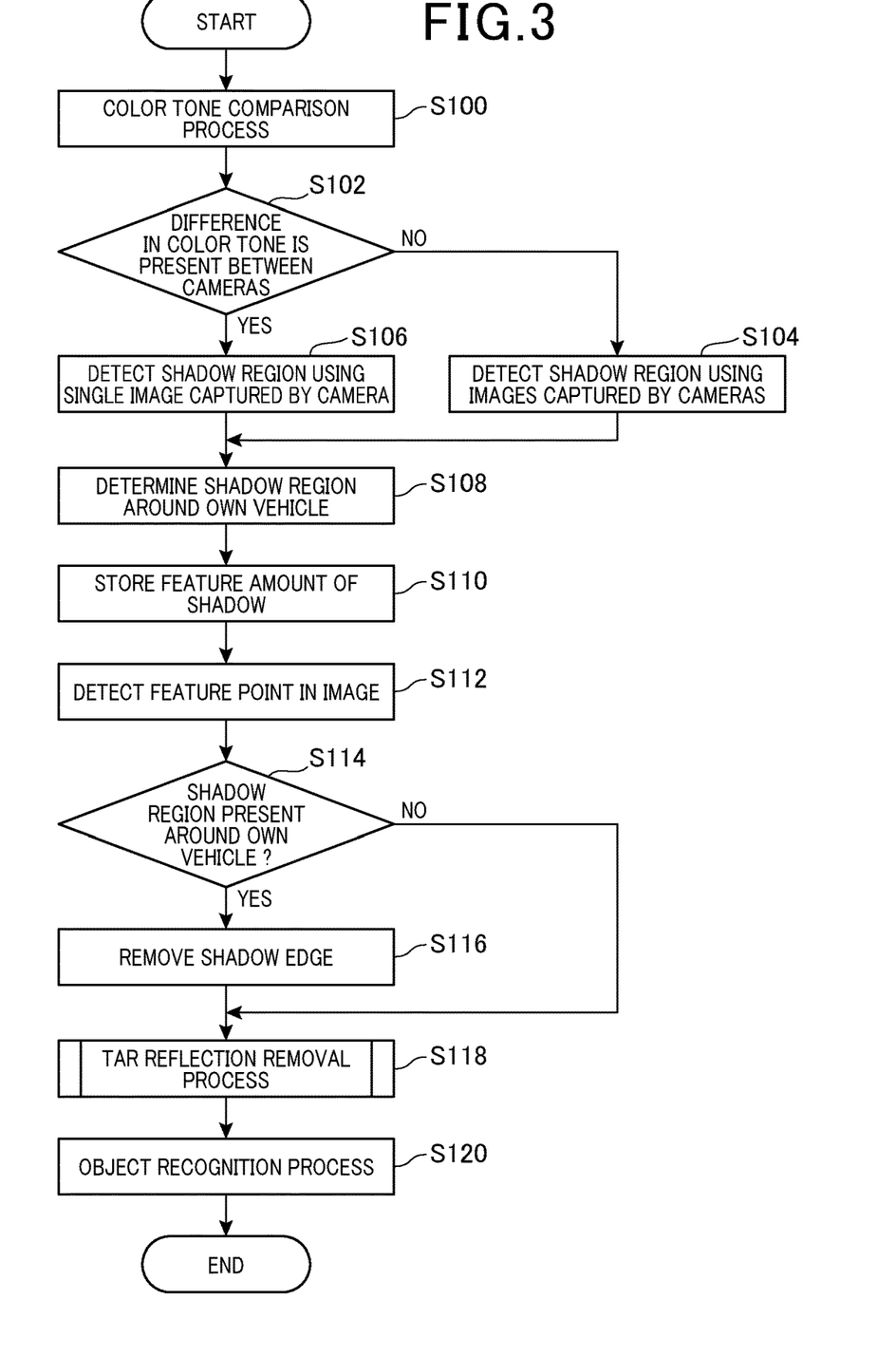
FIG. 3 is a flow chart showing a procedure of an image recognition process performed by the vehicle surroundings recognition apparatus.

Returning to the description of the flow chart in FIG. 3, at step S102, when it is determined that the plurality of images have a difference in color tone (YES at step S102), the vehicle surroundings recognition apparatus 1 causes control to proceed to step S106. At step S106, the vehicle surroundings recognition apparatus 1 detects a shadow region by comparing information on pixels as the comparison targets extracted from a single image of the images captured by the cameras 20*a* to 20*d*. The shadow region is a region in which a shadow is cast on the road surface of the road.

For example, when the cameras 20*a* to 20*d* are different in white balance setting or road surfaces of the road on the left and right sides of the vehicle 2 are different in color, the plurality of images may be observed to have different color tones. In such a situation, if a shadow is detected by comparing luminance or a color component of pixels between the plurality of different images, a pixel value of a shadow may be close to a pixel value of a sunny region, and accuracy of the shadow detection may be reduced. In the present embodiment, therefore, when the plurality of different images have different color tones, the vehicle surroundings recognition apparatus 1 compares information on pixels extracted from a single image. In this manner, it is possible to prevent the reduction in accuracy of the shadow detection caused by the difference in color tone between the images.

Specifically, as the comparison targets from a single image, the vehicle surroundings recognition apparatus 1 extracts pixels in a predetermined image area corresponding to an area including the road surface in the vicinity of the vehicle 2. Then, the vehicle surroundings recognition apparatus 1 calculates a difference, between the pixels as the comparison targets extracted from the single image, in luminance and intensity of a blue color component included in a color represented by the pixels. As a result of the calculation, the vehicle surroundings recognition apparatus 1 detects, as a pixel corresponding to a shadow on the road surface, a pixel satisfying a condition that the luminance is lower by a predetermined threshold or more and the intensity of a blue component is higher by a predetermined threshold or more than a pixel as the comparison target with which the comparison is made.

A specific example of the process at step S106 will be described with reference to FIG. 11. The example in FIG. 11 assumes a situation where a shadow of the vehicle 2 itself extends from a position of the vehicle 2 toward the left rear side of the vehicle 2 on a road surface. Furthermore, on a road on which the vehicle 2 is travelling, only a road surface on the right side of the vehicle 2 exhibits a darker color than the surroundings as in a repaired pavement mark. In such a situation, if the vehicle surroundings recognition apparatus 1 compares color tones between images captured by the cameras 20*a* to 20*d*, a difference in color tone is observed between the image captured by the left camera 20*c* and the image captured by the right camera 20*d*.

Figure 11:
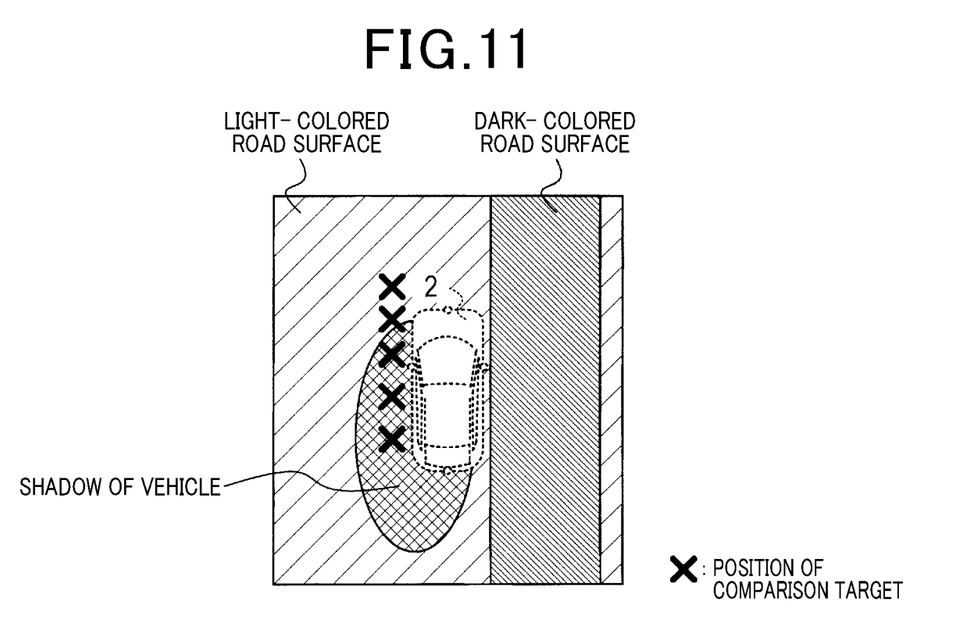
FIG. 11 is an explanatory diagram showing an example of the method of detecting a shadow region.

As in the example in FIG. 11, when two images of regions on the left and right sides of the vehicle 2 have different color tones, a shadow may not be able to be accurately determined by comparing luminance and a blue component of pixels between the two images. Thus, when the plurality of images have different color tones, the vehicle surroundings recognition apparatus 1 detects a shadow by comparing luminance and intensity of a blue component between pixels as the comparison targets extracted from a single image.

Even when road surfaces of the road have a uniform color tone, if the plurality of cameras have a difference in white balance setting, a difference in color tone is observed between the plurality of images. Also in such a case, the vehicle surroundings recognition apparatus 1 detects a shadow by comparing luminance and intensity of a blue component between pixels as the comparison targets extracted from a single image.

Figure 10:
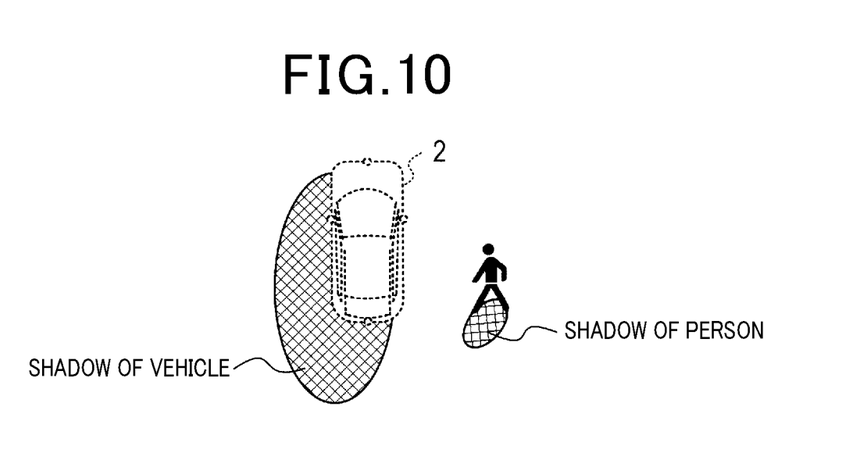
FIG. 10 is an explanatory diagram showing an example of the method of detecting a shadow region.

Returning to the description of the flow chart in FIG. 3, at steps S104 and S106, in addition, the vehicle surroundings recognition apparatus 1 acquires a pixel value indicating the luminance and the color of the pixel corresponding to the shadow detected on the road surface in the vicinity of the vehicle 2. Then, the vehicle surroundings recognition apparatus 1 detects a shadow region in the entire image by comparing the acquired pixel value of the shadow with a pixel value of pixels of the entire image and determining whether the acquired pixel value indicates a shadow. In this manner, as illustrated in FIG. 10, the vehicle surroundings recognition apparatus 1 can promptly and accurately detect not only the shadow of the vehicle 2 itself but also a shadow of another object that is present in the surroundings of the vehicle 2.

At step S108, the vehicle surroundings recognition apparatus 1 integrates the shadow regions detected in the images at step S104 or S106 and determines a position of a shadow region in the entire surroundings of the vehicle 2. At step S110, the vehicle surroundings recognition apparatus 1 stores, in the memory, a feature amount indicating the luminance and the blue component of the shadow detected at step S104 or S106. By using, in the next and subsequent image recognition processes, the feature amount of the shadow stored at step S110 as a reference value to detect a shadow in a subsequently captured image, the shadow can be detected at a higher speed. Furthermore, the vehicle surroundings recognition apparatus 1 may store a direction in which the shadow extends and use, in the next and subsequent image recognition processes, the stored direction as a reference value to determine a position from which pixels as the comparison targets are extracted. The processes from steps S100 to S110 correspond to a process implemented by the function of the shadow detection unit 11.

At step S112, the vehicle surroundings recognition apparatus 1 detects a feature point in the image captured by the cameras 20a to 20d. In the present embodiment, for example, a portion in the image in which a pixel value is discontinuously changed is detected as the feature point. When the vehicle surroundings recognition apparatus 1 searches for a feature point in the detected shadow region, the vehicle surroundings recognition apparatus 1 preferably differentiates a threshold for the change in pixel value to be determined as the feature point from thresholds applied to other regions. The process at step S112 corresponds to a process implemented by the function of the feature point detection unit 12.

At step S114, the vehicle surroundings recognition apparatus 1 causes the process to branch depending on whether a shadow region that is present in the image has been detected in the process at step S104 or S106. Specifically, when a shadow region is present in the image (YES at step S114), the vehicle surroundings recognition apparatus 1 causes control to proceed to step S116. On the other hand, when no shadow region is present in the image (NO at step S114), the vehicle surroundings recognition apparatus 1 skips step S116 and causes control to proceed to step S118.

At step S116, from the group of feature points detected in the image at step S112, the vehicle surroundings recognition apparatus 1 removes a feature point corresponding to a shadow edge which is a boundary between the shadow region determined at step S108 and a sunny region. Specifically, when a portion having a feature amount equivalent to the stored feature amount of the luminance and the blue component of the shadow is present around a detected feature point, the vehicle surroundings recognition apparatus 1 determines the feature point as the feature point corresponding to the shadow edge, and removes the determined feature point.

Figure 12:
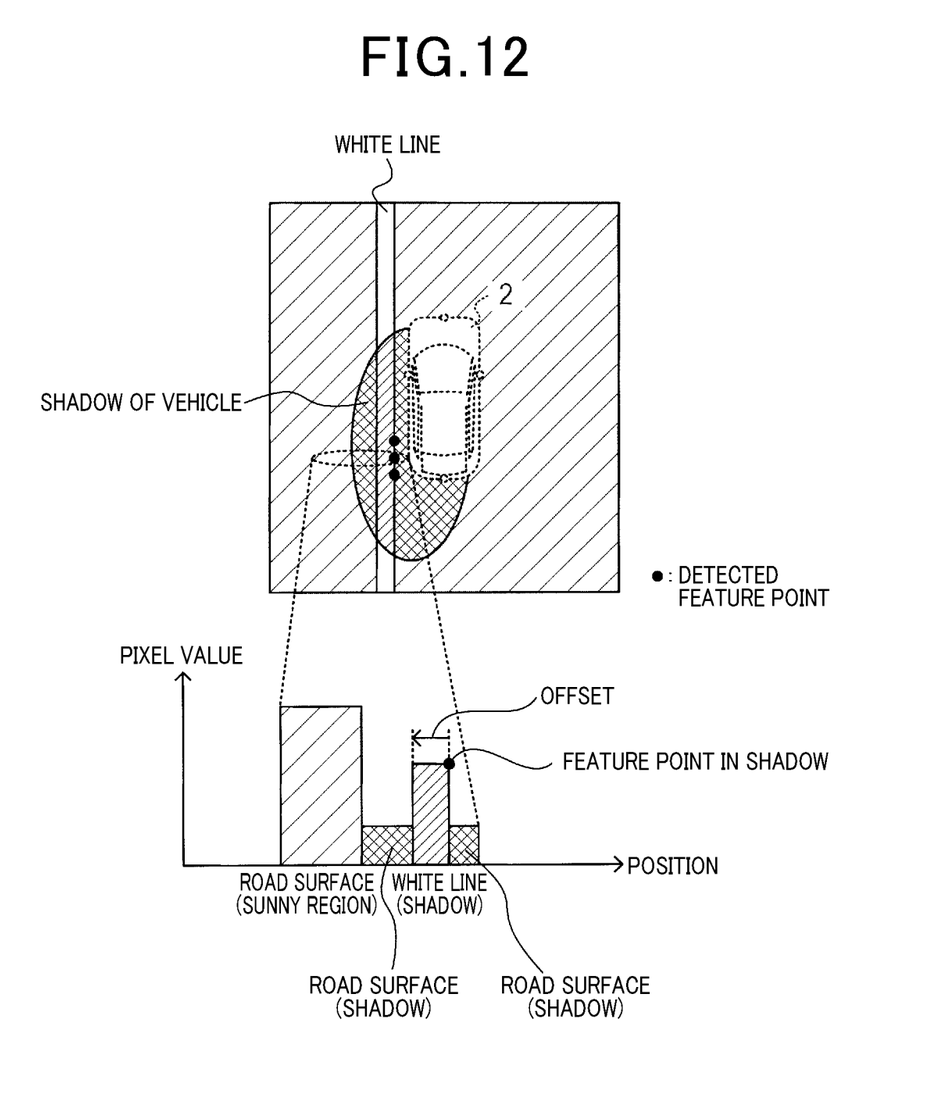
FIG. 12 is an explanatory diagram showing an example of a method of recognizing a white line.

As illustrated in FIG. 12, in a situation where a white line of a lane marker which is an image recognition target is present in a shadow of the vehicle 2, the vehicle surroundings recognition apparatus 1 preferably determines whether a feature point corresponds to the shadow edge in the following manner. FIG. 12 shows a situation where feature points that form an edge of a white line as a target are detected in a shadow of the vehicle 2. When a feature point of a white line is detected in a shadow, a large gap in pixel value is present between a road surface in the shadow and the white line in the shadow, and thus the feature point may be misidentified as a boundary between the road surface in the shadow and a road surface in a sunny region.

Thus, for the feature points that are present in the shadow, the vehicle surroundings recognition apparatus 1 checks a pixel value of a region that is offset in a width direction of the road by a distance in the image corresponding to a width of the lane marker. Depending on whether pixel values equivalent to the feature points that are present in the shadow are distributed in a region with the width of the lane marker, the vehicle surroundings recognition apparatus 1 determines whether the feature points are the lane marker in the shadow or the boundary between the shadow and the sunny region.

Figure 13:
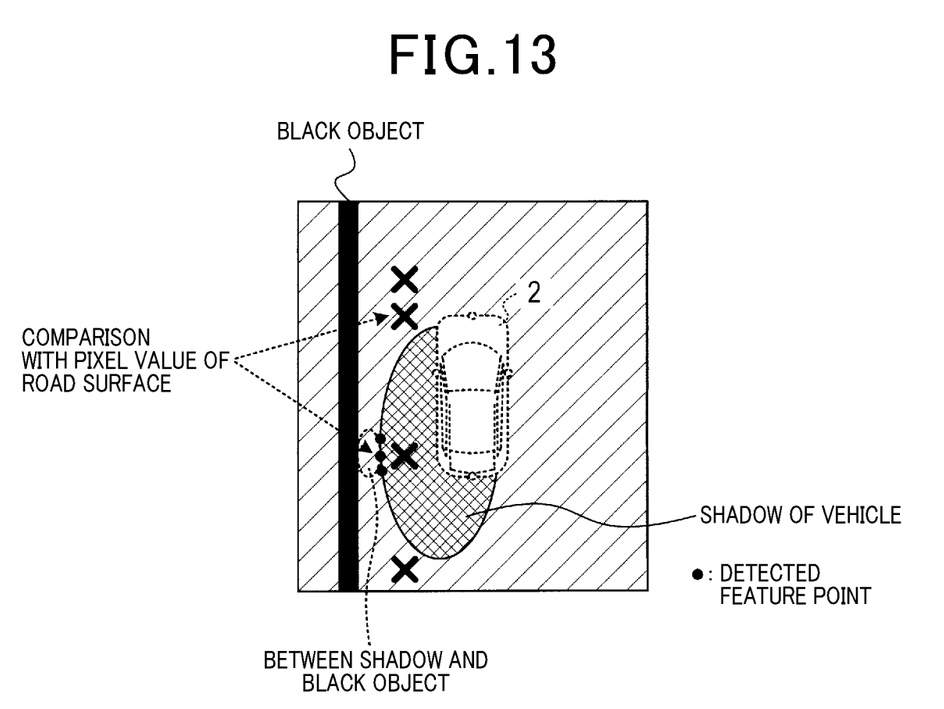
FIG. 13 is an explanatory diagram showing an example of a method of preventing misidentification of a white line.

As illustrated in FIG. 13, in a situation where a black object such as tar having a strip shape is present on the side of a shadow of the vehicle 2, the vehicle surroundings recognition apparatus 1 preferably determines whether a detected feature point corresponds to the shadow edge in the following manner. FIG. 13 shows a situation where feature points that form a shadow edge are detected between a shadow of the vehicle 2 and a black object. When a feature point is detected between a shadow and a black object, a bright road surface around the feature point may be misidentified as a white line of a lane marker.

Thus, the vehicle surroundings recognition apparatus 1 compares a pixel value of a region sandwiched between the shadow and the black object with a pixel value of a road surface in a sunny region acquired in advance. As a result of the comparison, when the pixel value of the region sandwiched between the shadow and the black object is equivalent to the pixel value of the road surface in the sunny region, the vehicle surroundings recognition apparatus 1 determines the sandwiched region as the road surface in the sunny region. In this case, the vehicle surroundings recognition apparatus 1 removes, as the shadow edge, the feature points that are present between the shadow and the black object.

Returning to the description of the flow chart in FIG. 3, the processes at steps S114 and S116 correspond to a process implemented by the function of the shadow edge removal unit 13. At next step S118, the vehicle surroundings recognition apparatus 1 performs a tar reflection removal process for the group of feature points remained in the image after the processes to step S116. A procedure of the tar reflection removal process at step S118 will be described with reference to a flow chart in FIG. 4. The tar reflection removal process is a process of removing, from the group of feature points detected in the image, a feature point caused by light reflected by oil contamination such as tar that is present on the road.

Figure 4:
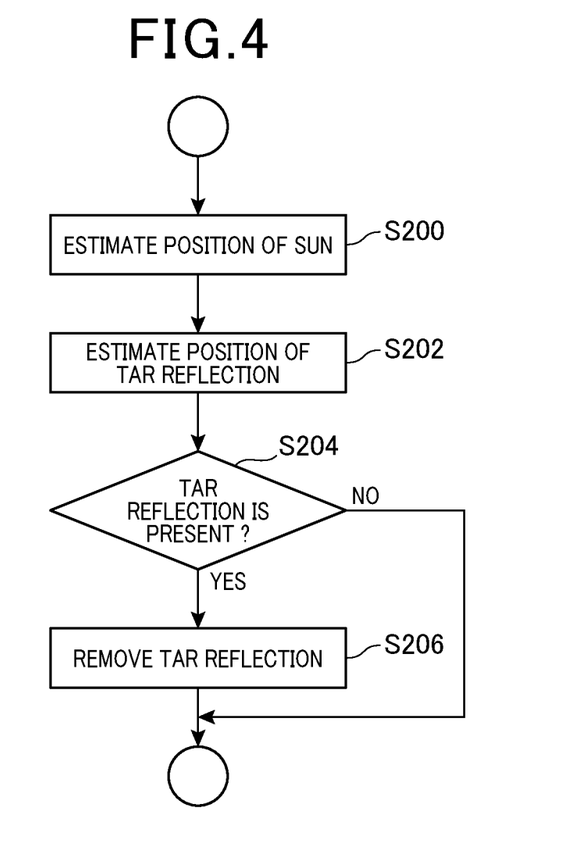
FIG. 4 is a flow chart showing a procedure of a tar reflection removal process performed by the vehicle surroundings recognition apparatus.

At step S200, the vehicle surroundings recognition apparatus 1 estimates a position of the sun based on the already detected direction in which the shadow extends. Specifically, the vehicle surroundings recognition apparatus 1 estimates that the sun is present at a position on a side opposite to the direction in which the shadow extends. At step S202, based on the position of the sun estimated at step S200, the vehicle surroundings recognition apparatus 1 estimates a position of light reflected by tar or the like in the image. Specifically, the vehicle surroundings recognition apparatus 1 determines, as the position of the light reflected by tar or the like, a portion having luminance of a predetermined threshold or more in a region in the image corresponding to a road surface between the position of the sun and the vehicle 2.

At step S204, the vehicle surroundings recognition apparatus 1 causes the process to branch depending on whether light reflected by tar or the like is present in the image. When light reflected by tar or the like is present in the image (YES at step S204), the vehicle surroundings recognition apparatus 1 causes control to proceed to step S206. At step S206, from the group of feature points detected in the image, the vehicle surroundings recognition apparatus 1 removes a feature point corresponding to the light reflected by tar or the like estimated at step S202. On the other hand, when no light reflected by tar or the like is present in the image (NO at step S204), the vehicle surroundings recognition apparatus 1 skips step S206 and ends the tar reflection removal process.

Returning to the description of the flow chart in FIG. 3, at next step S120, based on the group of feature points remained in the image after the processes to step S118, the vehicle surroundings recognition apparatus 1 performs an object recognition process of detecting an object corresponding to the specific target. Specifically, the vehicle surroundings recognition apparatus 1 detects a target such as a lane marker by using a well-known image recognition algorithm using a feature point of an image. The vehicle surroundings recognition apparatus 1 may be configured to also detect, as the target, a traffic moving object such as a vehicle or a person or an object such as a road sign, besides the lane marker. The process at step S120 corresponds to a process performed as the function of the recognition unit 14. Thus, the vehicle surroundings recognition apparatus 1 ends the image recognition process.

Advantages

The vehicle surroundings recognition apparatus 1 of the embodiment yields the following advantages.

The vehicle surroundings recognition apparatus 1 determines a shadow region based on not only luminance of an image but also intensity of a blue component included in a color represented by the image. In this manner, the vehicle surroundings recognition apparatus 1 can improve robustness against a change in brightness of the image and accurately detect a shadow region. Then, by removing a feature point corresponding to an edge of the shadow region from a group of feature points detected in the image, the vehicle surroundings recognition apparatus 1 can accurately detect an intended target.

Furthermore, the vehicle surroundings recognition apparatus 1 is capable of detecting a shadow by comparing pixels between different images captured by the plurality of cameras 20a to 20d. In this manner, the vehicle surroundings recognition apparatus 1 can accurately detect a shadow from various directions around the vehicle 2 according to a direction in which the shadow extends.

Furthermore, when a plurality of images have an equivalent color tone, the vehicle surroundings recognition apparatus 1 detects a shadow by comparing pixels between different images. On the other hand, when the plurality of images have different color tones, the vehicle surroundings recognition apparatus 1 detects a shadow by comparing pixels in a single image. In this manner, the vehicle surroundings recognition apparatus 1 can avoid comparing pixels between the images having different color tones and accurately detect a shadow based on luminance and a color of the image.

Modifications (a) The above embodiment describes the example in which the four cameras 20a to 20d are used as the imaging unit. The present disclosure is not limited to this, and the vehicle 2 only needs to include at least one camera. When the vehicle 2 includes a single camera, the vehicle surroundings recognition apparatus 1 converts an image captured by the single camera into a bird's-eye view image and removes an edge of a shadow region detected in the image, and then detects a target. Furthermore, the above embodiment describes the example in which the digital color image represented by the YUV color model is used to determine a shadow region. The present disclosure is not limited to this, and for example, a digital color image represented by an RGB color model may be used to determine a shadow region.

(b) At nighttime, in a tunnel that sunlight does not reach, or the like, the influence of the Rayleigh scattering is not prominent, and thus a blue component of an image of a shadow is not observed with high intensity. Therefore, the vehicle surroundings recognition apparatus 1 may be configured to perform only the determination regarding luminance of an image without performing the determination regarding a blue component of the image when a shadow is detected at nighttime or in a tunnel. Furthermore, in an environment where a sodium lamp is used as a light source, a yellow component tends to be observed with high intensity in an image of a shadow. Therefore, the vehicle surroundings recognition apparatus 1 may be configured to determine intensity of a yellow component in an image when a shadow is detected in the environment where a sodium lamp is used as a light source.

(c) The vehicle surroundings recognition apparatus 1 may be configured to estimate an azimuth based on the detected direction of the shadow and date and time of the detection. From the estimated azimuth, the vehicle surroundings recognition apparatus 1 can estimate a region in which tar or the like that is present on the road surface is highly likely to be brightly luminous by reflecting light.

(d) In the embodiment, a function of a single component may be shared by a plurality of components, or a function of a plurality of components may be implemented by a single component. Furthermore, a part of the configuration of the embodiment may be omitted. Furthermore, at least a part of the configuration of the embodiment may be, for example, added to or substituted by another part of the configuration of the embodiment. All aspects included in the technical idea specified by the wording of the claims are embodiment of the present disclosure.

(e) The present disclosure may also be implemented in various forms such as a system including the vehicle surroundings recognition apparatus 1 as a component, a program for allowing a computer to function as the vehicle surroundings recognition apparatus 1, a tangible storage medium such as a semiconductor memory storing the program, and an object recognition method.

What is claimed is:

1. A vehicle surroundings recognition apparatus that acquires a plurality of images of different areas each including a road around a vehicle by an imaging unit mounted on the vehicle and recognizes a specific target that is present in the surroundings of the vehicle from the plurality of images, the vehicle surroundings recognition apparatus comprising:
 a processor; and
 non-transitory, computer-readable medium storing instructions that, when executed by the processor, implements:
  a shadow detection unit configured to compare color tones between the plurality of images and, in a case when difference in color tones is present between the plurality of images, to detect a shadow region based on an absolute difference, between a plurality of elements constituting an image of the plurality of images, in intensity of a specific color component included in colors represented by the plurality of elements being greater than a first predetermined threshold and an absolute difference in luminance between the plurality of elements being lower than a first predetermined threshold, the shadow region being a region in the image in which a shadow is cast on a surface of the road;

a feature point detection unit configured to detect feature points in the image; and a recognition unit configured to recognize the target based on the shadow region detected by the shadow detection unit and a group of feature points detected by the feature point detection unit.

2. The apparatus according to claim 1, wherein:

the imaging unit includes a plurality of cameras configured to capture the plurality of images of different areas.

3. The apparatus according to claim 1, wherein, in a case when difference in color tones is not present between the plurality of images, the shadow detection unit is configured to detect the shadow region by comparing intensity of the specific color component and luminance between elements selected from each of the plurality of images.

4. The apparatus according to claim 1, wherein the shadow detection unit is configured to detect the shadow region by comparing intensity of the specific color component and luminance of a plurality of elements included in a specific region in the image.

5. The apparatus according to claim 1, wherein the shadow detection unit is configured to store image information indicating a color and luminance of a portion corresponding to the detected shadow region and use the stored image information to detect a shadow region included in a subsequently captured image.

6. The apparatus according to claim 1, wherein the non-transitory, computer-readable medium storing instructions that, when executed by the processor, further implements a shadow edge removal unit configured to remove, from the group of feature points detected by the feature point detection unit, a feature point corresponding to an edge of the shadow region detected by the shadow detection unit, wherein the recognition unit is configured to recognize the target from the group of feature points from which the feature point corresponding to the edge of the shadow region has been removed by the shadow edge removal unit.

7. The apparatus according to claim 1, wherein the specific color component is a blue component.

* * * * *